April 6, 1926. 1,579,521
C. GIRL
AUTOMOBILE BUMPER
Filed June 27, 1925
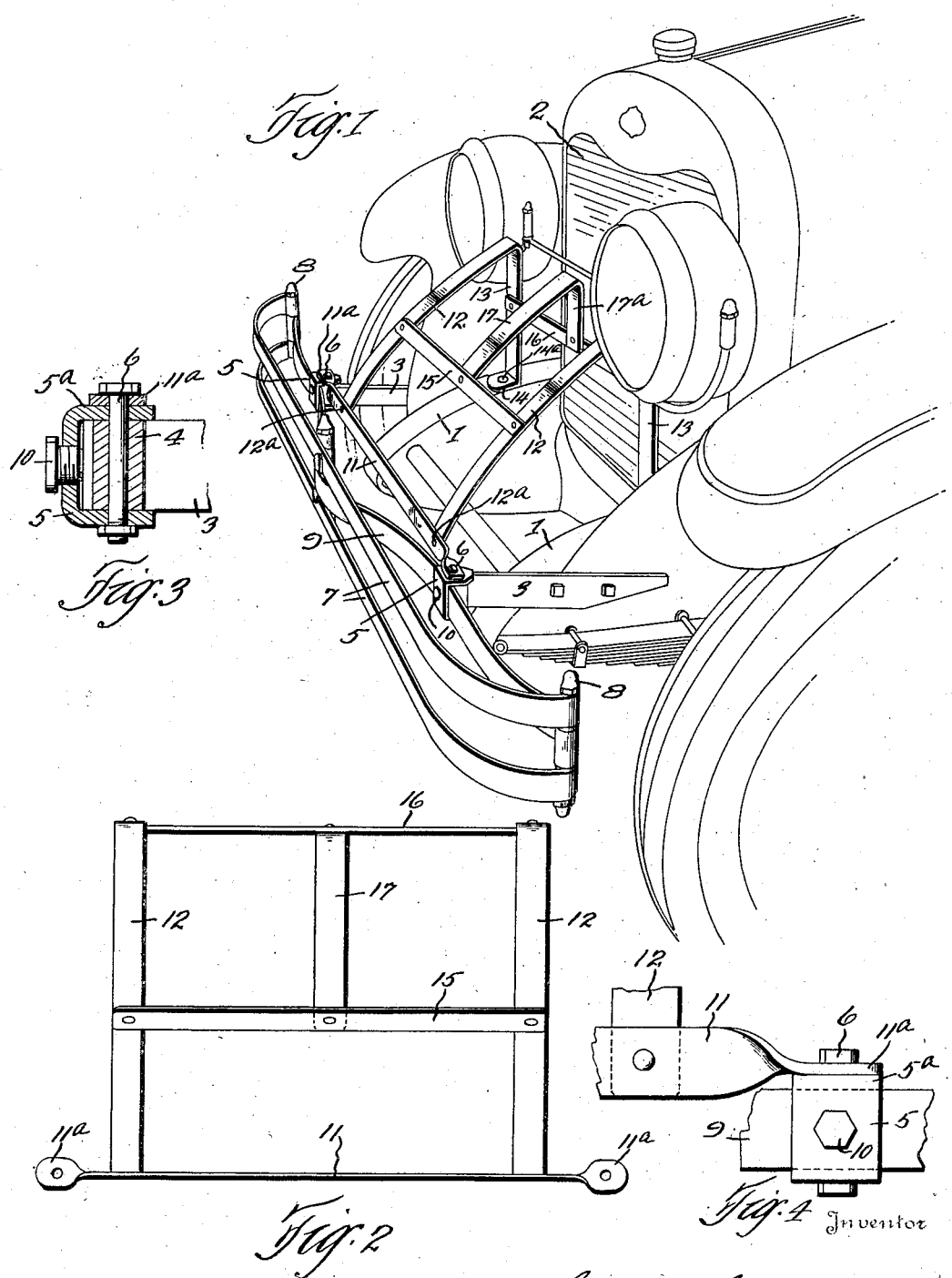

Patented Apr. 6, 1926.

1,579,521

UNITED STATES PATENT OFFICE.

CHRISTIAN GIRL, OF DETROIT, MICHIGAN, ASSIGNOR TO THE C. G. SPRING & BUMPER COMPANY, OF DETROIT, MICHIGAN, A CORPORATION OF DELAWARE.

AUTOMOBILE BUMPER.

Application filed June 27, 1925. Serial No. 39,913.

*To all whom it may concern:*

Be it known that I, CHRISTIAN GIRL, a citizen of the United States, residing at Detroit, in the county of Wayne and State of Michigan, have invented a certain new and useful Improvement in Automobile Bumpers, of which the following is a full, clear, and exact description, reference being had to the accompanying drawings.

This invention relates to bumpers, and more particularly to guards or bumpers that are intended for the protection of the ends of automobiles and especially the front ends and radiators of such vehicles. The general object of the invention is to provide a bumper which may be conveniently attached to and removed from its supporting members and which, when in place, will serve to protect such end of the vehicle from injury.

A further object of the invention is to provide a bumper of this character which will be efficient for the purpose for which it is designed; also a guard or bumper which, while capable of and adapted for use with a radiator, is also capable of cooperating with and is arranged to cooperate with the transverse bumper, usually provided at the end of the car, to form therewith a complete protection for such end.

Other and more limited objects of the invention will appear in the specification and are shown in the drawings in which Fig. 1 represents a perspective view of the front of an automobile having my invention applied thereto; Fig. 2 is a front elevation of the radiator-protecting guard or bumper shown in the preceding view; Fig. 3 is a vertical sectional view through the outer end of one of the bumper-supporting arms and the members associated therewith; and Fig. 4 is a detail in elevation of the clamping means and the parts of the guards or bumpers associated therewith.

The bumper or guard structure shown herein is applied to the front of the automobile; hence the terms "front" and "rear" will be employed in the description and some of the claims as a matter of convenience of description, but without any intention of limiting the application of the said structure to any particular end of the automobile.

Describing the various parts by reference characters, 1 denotes the front ends of the side members of an automobile and 2 the radiator thereof. 3 denotes an arm secured to each of the side members, each arm being provided at its front end with an eye 4. The arms support, through U-shaped clamps 5 and vertical pivot bolts 6, a bumper which may be of any approved construction, the one shown herein being of the type shown, described and claimed in McGregor Patent No. 1,372,154, issued March 22, 1921 and comprising a pair of front bars 7, vertically spaced and connected at their ends by bolts 8, with the ends of the rear bar 9, which rear bar has its center projected between and connected to the centers of the bars 7. The bumper thus far described is supported by the arms 3 and the clamps 5 by slipping the clamps over the rear bar 9 and then inserting the pivot bolts in place, after which the bar 9 may be forced against the fronts of the eyes 4 by means of a set screw 10.

The radiator guard or bumper which is shown herein comprises a lower transverse bar 11 and side bars comprising each an upwardly and rearwardly inclined side member 12, said members being connected at their lower ends to the bar 11, as by rivets 12$^a$. From the upper ends of the members 12 depend vertical leg members 13, each having a foot 14 at its bottom which is adapted to rest upon the side member 1 therebeneath, and to be secured thereto, as by a rivet 14$^a$.

The side members 12 of the side bars are connected by a horizontal brace bar 15, intermediate the tops and bottoms of such members, and the vertical legs 13 are connected intermediate their ends by a transverse bar 16.

The bars 15 and 16 are connected by a central brace bar which comprises an upwardly and rearwardly curved bar 17 having a vertical leg 17$^a$, the lower end of the bar 17 being connected to the central portion of the bar 15 and the lower end of the leg 17$^a$ being connected to the central portion of the cross bar 16. The bar 17 is preferably curved so as to correspond in shape to the portions of the side members 12 which are above the bar 15.

The web of the bar 11 stands substantially vertical and the ends are turned at substantially right angles so as to provide horizontal feet 11$^a$ adapted to rest upon the tops 5$^a$ of the clamps 5 and to be secured to said clamps and thereby to the bumper bar 9 and the arms 3 by the pivot bolts 6.

The construction shown and described herein affords complete and efficient protection for the end of the vehicle to which the complete bumper structure is attached, the complete structure comprising the bumper 7—9 inclusive and the bumper 11—17ª, inclusive.

The particular form shown and described herein provides not only a bumper structure which will protect the whole end of the car, but also a single bumper which is particularly useful for the protection of radiators, although this last mentioned construction may in some instances be useful for the rear of automobiles.

Having thus described my invention, what I claim is:—

1. The combination, with the side members and radiator of an automobile, of an arm secured to and projecting forwardly from each side member, a bumper secured to said arms and extending transversely of the side members, and a guard or bumper comprising a pair of upwardly and rearwardly extending side bars, a bar extending transversely of the side bars and connected thereto and having its ends supported by said arms, and means for supporting the upper end rear ends of the said side bars from their respective side members.

2. The combination, with the side members of an automobile, of an arm secured to and projecting from each side member, a bumper secured to said arms and extending transversely of the side members, and a guard or bumper comprising a pair of upwardly extending side bars, a bar extending transversely of the side bars and connected thereto and having its ends supported by said arms, and means for supporting the upper ends of the said side bars from their respective side members.

3. The combination, with the side members and radiator of an automobile, of a bumper supported by said side members and extending across the automobile, and a guard or bumper comprising a lower transverse bar connected to the first mentioned bumper and a pair of side bars extending upwardly and rearwardly from said transverse bar and each having a leg supporting the rear end thereof from the cooperating side member.

4. The combination, with the frame of an automobile, of a bumper supported by said frame and extending across the automobile, and a guard or bumper comprising a lower transverse bar connected to the first mentioned bumper and a pair of side bars extending upwardly from said transverse bar and each having a leg supporting the upper end thereof from the said frame.

5. The combination, with the side members and radiator of an automobile, of an arm secured to and projecting forwardly from each side member, a bumper extending transversely of the automobile, clamps securing the said bumper to the outer ends of said arms, and a guard or bumper comprising a transverse bar connected to said clamps and arms and side bars extending upwardly and rearwardly from the transverse bar and each having a leg supporting the rear end thereof from the corresponding side member.

6. The combination, with the frame of an automobile, of arms secured to and projecting from such frame, a bumper extending transversely of the automobile, clamps securing the said bumper to the outer ends of said arms, and a guard or bumper comprising a transverse bar connected to said clamps and arms, and side bars extending upwardly and rearwardly from the transverse bar and each having a leg supporting the upper end thereof from the said frame.

7. A bumper structure for the end of an automobile, said structure comprising a transversely extending lower bumper, a transverse bar adapted to be secured to said lower bumper, side bars extending upwardly and away from said transverse bar and connected thereto, and means for supporting the upper ends of said side bars from the vehicle frame.

8. A bumper structure for the end of an automobile, said structure comprising a transversely extending lower bumper, a transverse bar adapted to be secured to such lower bumper, a pair of side bars connected to and extending upwardly and away from the transverse bar and the said bumper, the upper ends of the side bars being provided with legs for supporting the same from the side members of the automobile, and one or more transverse bars connecting the said side bars.

9. A bumper for the end of an automobile, comprising a transverse bottom bar, and a pair of side bars secured to and extending upwardly and away from said transverse bar and each having a leg for supporting its upper end from the frame of the automobile.

10. A bumper for the end of an automobile comprising a transverse bottom bar, a pair of side bars secured to and extending upwardly and away from said transverse bar and each having a leg for supporting its upper end from the frame of the automobile, a pair of spaced transverse bars, additional to the first transverse bar and connecting the side bars and the legs thereof, and a bar intermediate of the side bars and connecting the last mentioned transverse bars and conforming in configuration to the corresponding parts of the side bars and legs with which said transverse bars are connected.

11. A bumper for the end of an automobile, comprising a pair of side bars, each having a leg for supporting its upper end from the frame of the automobile, and a pair of spaced transverse bars connecting the side bars and the legs thereof, and a bar intermediate of the side bars and connecting the transverse bars and conforming in configuration to the corresponding parts of the side bars and legs with which the said transverse bars are connected.

12. A bumper for the end of an automobile comprising a lower transverse bar, a pair of side bars connected to and extending upwardly and away from the transverse bar, a pair of additional transverse bars connected to the said side bars, and an intermediate bar connected to the two last-mentioned transverse bars and conforming in contour to the parts of the side bars included between such transverse bars.

13. A bumper for the end of an automobile, comprising a pair of side bars, a pair of transverse bars connected to the said side bars, and an intermediate bar connected to the transverse bars and conforming in contour to the parts of the side bars included between such transverse bars.

In testimony whereof, I hereunto affix my signature.

CHRISTIAN GIRL.